United States Patent
Irvine

(10) Patent No.: US 8,910,576 B2
(45) Date of Patent: Dec. 16, 2014

(54) BOMB FOR DEPLOYMENT FROM AN AIR VEHICLE

(75) Inventor: Rodney Andrew Irvine, Dursley (GB)

(73) Assignee: MBDA UK Limited, Stevenage, Hertfordshire (GB)

( * ) Notice: Subject to any disclaimer, the term of this patent is extended or adjusted under 35 U.S.C. 154(b) by 0 days.

(21) Appl. No.: 13/575,882

(22) PCT Filed: Jun. 28, 2012

(86) PCT No.: PCT/GB2012/000552
§ 371 (c)(1),
(2), (4) Date: Jul. 27, 2012

(87) PCT Pub. No.: WO2013/001267
PCT Pub. Date: Jan. 3, 2013

(65) Prior Publication Data
US 2013/0112101 A1    May 9, 2013

(30) Foreign Application Priority Data

Jun. 28, 2011  (GB) .................................. 1110994.9
Jul. 12, 2011  (EP) .................................... 11192305

(51) Int. Cl.
| | |
|---|---|
| F02K 9/10 | (2006.01) |
| F02K 9/12 | (2006.01) |
| F02K 9/18 | (2006.01) |
| F02K 9/22 | (2006.01) |
| F02K 9/95 | (2006.01) |
| F42B 15/00 | (2006.01) |
| F42B 15/10 | (2006.01) |
| F42B 10/38 | (2006.01) |

(52) U.S. Cl.
CPC ... *F02K 9/10* (2013.01); *F02K 9/12* (2013.01); *F02K 9/18* (2013.01); *F02K 9/22* (2013.01); *F42B 15/10* (2013.01); *F42B 10/38* (2013.01); *F02K 9/95* (2013.01)

USPC .............. 102/381; 102/374; 102/291; 60/253

(58) Field of Classification Search
CPC ............... F02K 9/10; F02K 9/12; F02K 9/18; F02K 9/22; F02K 9/95; F42B 15/00; F42B 15/10
USPC ......... 102/374, 380, 381, 382, 287, 289, 291, 102/490, 376, 377, 378, 379; 60/253
See application file for complete search history.

(56) References Cited

U.S. PATENT DOCUMENTS

| | | |
|---|---|---|
| 2,114,214 A | 4/1938 | Damblanc |
| 2,816,721 A | 12/1957 | Taylor |

(Continued)

FOREIGN PATENT DOCUMENTS

| | | |
|---|---|---|
| CH | 307 639 A | 1/1950 |
| FR | 859.352 A | 12/1940 |
| FR | 1.357.255 A | 2/1964 |
| FR | 1.510.159 A | 1/1968 |
| WO | WO 2010/082971 A2 | 7/2010 |

OTHER PUBLICATIONS

Written Opinion of the International Searching Authority for PCT/GB2012/000552; Dec. 2013.*

(Continued)

*Primary Examiner* — James S Bergin
(74) *Attorney, Agent, or Firm* — Buchanan Ingersoll & Rooney PC

(57) ABSTRACT

A bomb for deployment from an air vehicle includes a rocket motor for propelling the bomb. The rocket motor includes propellant which at least partially defines a void downstream of an initial burning surface. As the propellant is burned the void will be exposed, increasing the surface area of the burning surface of the propellant to increase the thrust of the rocket motor.

9 Claims, 1 Drawing Sheet

(56) References Cited

U.S. PATENT DOCUMENTS

| | | | |
|---|---|---|---|
| 3,300,549 A | | 1/1967 | Matsubara |
| 4,924,775 A | * | 5/1990 | Humphrey .................... 102/352 |
| 6,148,610 A | | 11/2000 | Calabro et al. |
| 7,000,377 B1 | | 2/2006 | Knight |
| 7,254,936 B1 | * | 8/2007 | Knight ............................ 60/250 |
| 8,191,351 B2 | * | 6/2012 | Loehr et al. ..................... 60/256 |
| 8,453,572 B2 | * | 6/2013 | Dryer et al. ................... 102/374 |
| 2013/0112101 A1 | * | 5/2013 | Irvine ........................... 102/374 |

OTHER PUBLICATIONS

European Search Report issued on May 26, 2012 for European Application No. 11192305.8.

United Kingdom Search Report issued on Nov. 28, 2011 for United Kingdom Application No. GB1110994.9.

* cited by examiner

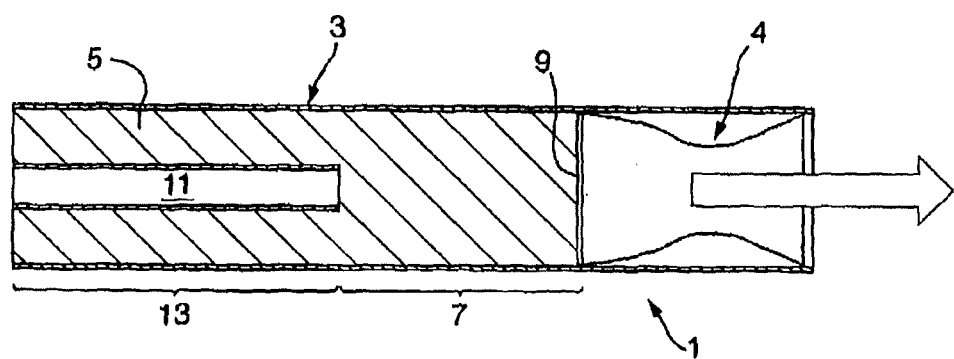
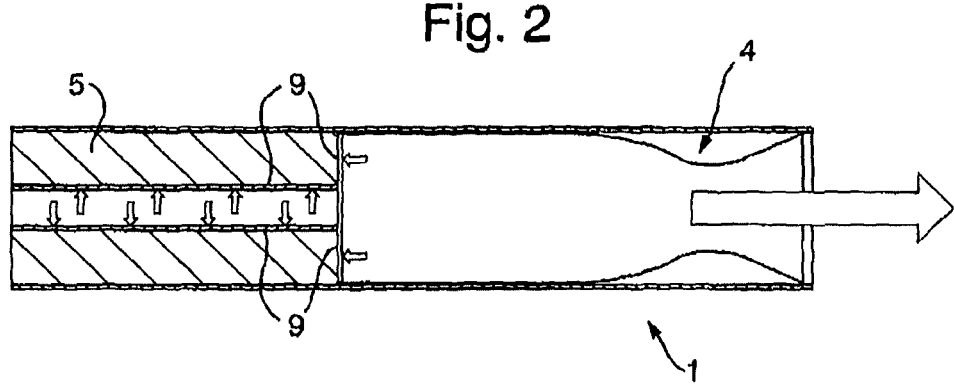

BOMB FOR DEPLOYMENT FROM AN AIR VEHICLE

TECHNICAL FIELD

The present invention relates to a bomb for deployment from an air vehicle, a rocket motor for use on such a bomb, and a method of deploying such a bomb from an air vehicle.

BACKGROUND OF THE INVENTION

When deploying a bomb from an air vehicle, such as an aircraft, the bomb is usually turned from a launch orientation (typically forward facing in the direction of travel of the aircraft) into a dive orientation (typically downwards and substantially vertical). At some altitudes there may be insufficient time for the bomb to move from the launch orientation to the dive orientation and accelerate to a sufficient speed to adequately impact the target.

There have been efforts to address this problem. For example, in a known arrangement a bomb is fitted with a rocket motor for providing constant thrust. This thrust increases the launch speed of the bomb and thus enables the bomb to turn faster to reach the dive orientation. The rocket motor then helps to accelerate the bomb towards the target. Such an arrangement is suitable for deployment at high altitude of around 8 km or higher, but at medium altitudes (for example between 5 km and 2 km) the bomb may still be travelling too slowly when it reaches the target to provide sufficient penetration.

It is desirable to provide an arrangement that reduces or mitigates the above-mentioned problem. Bombs are relatively inexpensive weapons as they tend not to have the complexity associated with some other weaponry such as missiles. It is also therefore desirable to address the above-mentioned problem without unduly increasing the complexity and/or cost of the bomb.

SUMMARY OF THE INVENTION

According to the first aspect of the invention, there is provided a bomb for deployment from an air vehicle, the bomb comprising a rocket motor for propelling the bomb, wherein the rocket motor comprises propellant, the propellant having an initial burning surface, and characterised in that the propellant at least partially defines a void downstream of the initial burning surface, the rocket motor being arranged such that as the propellant is burned the void will be exposed, thereby increasing the surface area of the burning surface of the propellant to provide an increased thrust of the rocket motor. This provides a relatively simple arrangement for imparting a low, then high, level of thrust to the bomb. Such a thrust profile may be especially advantageous for applications in which the bomb is for launching at medium altitude; more specifically, the turn into the dive orientation may be effected using the relatively low level of thrust such that the bomb maintains velocity, and the bomb may then be accelerated downwards towards and into the target, using the relatively high level of thrust.

To achieve this thrust profile, the propellant structure need have only two sections, a first section including the initial burning surface and providing a first level of thrust while the deployed bomb turns into the dive orientation, and a second section containing the void so as to provide a second level of thrust, comprising the increased thrust, throughout the remainder of the bomb's flight or until the propellant is used up. Such a propellant structure is simple to fabricate since it can be produced as a rod or cylinder with one or more cavities extending into it and partway along it from an end face. Each bomb only requires a single combustion chamber containing a single propellant structure.

As the skilled person will appreciate, exposure of the void in the present invention creates a non-negligible increase in the burning surface area and in the thrust. It will be appreciated that the void is therefore distinguished from any minor/microscopic variations in the structure of the propellant (e.g. flaws or gaps in the structure). The volume of the void is preferably at least 1% of the volume of the propellant, and more preferably at least 2%. The volume of the void may be at least 5% of the volume of the propellant. The rocket may be arranged such that when the void is exposed there is a step increase in the surface area of the burning surface. When the void is exposed the surface area of the burning surface may increase by at least 5%, and more preferably at least 10%. The surface area of the burning surface is increased relative to the area of the burning surface immediately prior to the exposure of the void. In some embodiments of the invention, this area is the same as the area of the initial burning surface, but it need not necessarily be.

It will be appreciated that the volume of propellant/void may be arranged in a wide variety of configurations falling within the scope of the invention. Some definitions of possible arrangements are listed below: The initial burning surface may be substantially planar, and the burning surface after exposure of the void may be non-planar (and having a greater surface area than the planar initial burning surface). The volume of propellant may comprise a first region, which is void free, extending from the initial burning surface to the void. The surface area of the burning surface between the initial burning surface and the void may be substantially constant. The propellant between the initial burning surface and the void may be a substantially cylindrical, and preferably substantially circular cylindrical, volume of propellant.

The void is free from propellant. The void may, however, contain other materials/fluids. For example the void may contain air. The contents of the void preferably do not prevent, or more preferably do not even inhibit, combustion of the propellant. The propellant is preferably solid propellant, for example a solid fuel/oxidiser mix.

The propellant at least partially defines the void. In some embodiments of the invention, some of the void may be defined by other parts of the rocket motor (e.g. the outer casing). In other embodiments, the void may be wholly defined by the propellant (e.g. completely surrounded by propellant).

The rocket motor may be arranged to generate a first thrust profile until exposure of the void, and a second thrust profile after exposure of the void. The average magnitude of thrust in the second profile is preferably greater than the average magnitude of thrust in the first profile. The first thrust profile is preferably sufficient for the bomb to maintain a suitable velocity. The first thrust profile is preferably arranged such that the bomb may be turned from a launch orientation to a dive orientation under the influence of the first thrust profile.

The bomb and rocket motor is a relatively simple arrangement. For example, whilst it may include basic control systems, the arrangement preferably does not include complex guidance, targeting and/or manoeuvring systems more typically seen on a missile. The arrangement is preferably designed for essentially pre-planned engagements.

It is known to vary the thrust of rocket motors per se. For example in some missile applications, it is known to provide a rocket motor having a variable nozzle throat such that the thrust can be varied. However, such an arrangement is relatively complex and expensive. In embodiments of the present invention, the rocket motor preferably comprises a fixed nozzle (i.e. with a fixed diameter throat). This facilitates a relatively simple arrangement.

The bomb may have a nominal weight of 500 lb (approx. 225 kg) or more, and more preferably, 2000 lb (approx. 900 kg) or more. The bomb may be up to 5000 lb (approx. 2250 kg) nominal weight.

The propellant may at least partially define a plurality, or even a multiplicity, of voids downstream of the initial burning surface. The rocket motor may be arranged such that as the propellant is burned, the voids will be exposed, thereby increasing the surface area of the burning surface of the propellant to increase the thrust of the rocket motor.

The bomb and rocket motor are typically integrated as a single product. In some other embodiments of the invention, the rocket motor may however be retro-fitted to an existing bomb. Thus, according to another aspect of the invention, there is provided a rocket motor for use as the rocket motor described herein.

According to yet another aspect of the invention there is provided a method of deploying a bomb from an air vehicle, the method comprising the steps of:

providing a bomb having a rocket motor for propelling the bomb into a target, the rocket motor comprising propellant, the propellant having an initial burning surface of a first surface area, and the propellant at least partially defining a void downstream of the initial burning surface, launching the bomb and burning the propellant from the initial burning surface;

turning the bomb from a launch orientation to a dive orientation;

wherein the rocket motor is arranged such that as the propellant is burned, the void in the propellant is exposed, thereby increasing the surface area of the burning surface of the propellant to increase the thrust of the rocket motor.

The bomb is preferably arranged such that the void is exposed when the bomb is in the dive orientation.

In principle, the rocket motor may be used for other applications, and not necessarily a bomb. According to a further aspect of the invention, there is provided a rocket motor comprising propellant, the propellant having an initial burning surface, and characterised in that the propellant at least partially defines a void downstream of the initial burning surface, the rocket motor being arranged such that as the propellant is burned the void will be exposed, thereby increasing the surface area of the burning surface of the propellant to increase the thrust of the rocket motor. According to another aspect, there is provided a weapon comprising such a rocket motor.

It will be appreciated that any features described with reference to one aspect of the invention are equally applicable to any other aspect of the invention, and vice versa.

DESCRIPTION OF THE DRAWINGS

An embodiment of the invention will now be described, by way of example only, with reference to the accompanying schematic drawings of which:

FIG. 1 is a schematic sectional view of a rocket motor for a bomb according to a first embodiment of the invention; and FIG. 2 is a schematic sectional view of the rocket motor in FIG. 1 as the void is exposed.

DETAILED DESCRIPTION

The rocket motor 1 in the first embodiment of the invention comprises a casing 3 attached to a nozzle assembly 4. The casing contains a volume of propellant 5 (which in this embodiment of the invention is a solid fuel/oxidiser mix). In common with conventional rocket motors, thrust is produced as the propellant 5 burns and combustion products are ejected at high velocity through the nozzle assembly (shown by the large arrows in FIGS. 1 and 2). In the first embodiment, the rocket motor is attached to the rear of a 2000 lb (approx. 4400 kg) bomb (not shown)

The rocket motor 1 in the first embodiment of the invention is a simple arrangement for providing two-stage thrust, as will be apparent from the description below: The propellant 5 in the rocket motor 1, occupies a circular cylindrical volume defined by the casing (shown in cross-section along the centre-line of the rocket motor, in FIGS. 1 and 2). The volume of the propellant can be notionally divided into a first region 7 and second region 13: the first region contains a uniformly distributed mass of propellant, in a circular cylindrical volume, which provides and extends from the initial burning surface 9, to the edge of a void 11. The second region 13 extends from the junction with the first region 7 to the end of casing 3. The second region contains a hollow tube-like volume of propellant defining a circular cylindrical void 11 extending into the propellant along the centreline of the rocket motor.

In general, the structure of the propellant 5 can be described as a rod or cylinder with first and second end faces, a first end face providing the initial burning surface 9 and one or more cavities extending from the second end face into the propellant 5 and partway along it in an axial direction so as to provide the void 11. If there is more than one cavity, the cavities will at least usually need to be symmetrically distributed about the centreline to avoid substantially affecting the path of the rocket motor 1 in flight. Such a structure can be relatively easily fabricated and lodged in a casing 3.

The burn characteristics of the rocket motor are shown by FIGS. 1 and 2. Referring first to FIG. 1, on launching the bomb the initial burn surface 9 is ignited. Since the burn surface 9 is planar and of constant cross-sectional area, the propellant 5 is consumed at a substantially constant rate and a substantially constant area of burning surface is maintained. A substantially constant thrust is therefore produced as the burning surface 9 gradually moves downstream. Movement of the propellant burning surface is indicated by the short arrows in FIGS. 1 and 2.

After a certain length of time, the burning surface 9 has moved sufficiently far downstream that it reaches the void 11. This stage is shown in FIG. 2. As the void 11 is exposed, the surface area of the burning surface 9 is rapidly increased because the internal face of the void also becomes part of the burning surface. FIG. 2 shows the surfaces of the propellant being consumed (the total surface being non-planar). This increase in the burning surface area causes a corresponding increase in the thrust generated.

The rocket motor of FIGS. 1 and 2 is especially useful for bombs being deployed from an air vehicle at relatively low altitude (for example at 5 km or lower). In these arrangements, conventional bombs may not have sufficient impact speed. For example, they can take too long to adopt a dive orientation and not reach sufficient velocity by the time they reach the target. When the bomb according to the first embodiment of the invention is deployed, the rocket motor enables the bomb to maintain a forward velocity that may be comparable with that of the aircraft. Under the action of various control surfaces on the bomb, the bomb is turned from the launch orientation (substantially horizontal) to a dive orientation (downwards). The initial thrust of the rocket motor reduces the time taken to adopt the dive orientation (in comparison to the same bomb without a rocket motor), and in the first embodiment of the invention, the rocket motor is also arranged such that the burning surface reaches the void when the bomb is in the dive orientation. At this point the thrust significantly increases and propels the bomb to, and into, the target.

Whilst the present invention has been described and illustrated with reference to a particular embodiment, it will be appreciated by those of ordinary skill in the art that the invention lends itself to many different variations not specifically illustrated herein. For example, the void may be a number of different shapes and/or there may be more than one void. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A bomb for deployment from an air vehicle, the bomb comprising:
    a rocket motor for propelling the bomb,
    wherein the rocket motor comprises propellant, the propellant having an initial burning surface of a first surface area, and wherein the propellant at least partially defines a void downstream of the initial burning surface, the rocket motor being arranged such that as the propellant is burned the void will be exposed, thereby increasing the first surface area of the burning surface of the propellant to provide an increased thrust of the rocket motor, and
    wherein the propellant is structured as a rod or cylinder with first and second end faces, the first end face providing the initial burning surface, and one or more cavities extending from the second end face into the propellant and partway along it in an axial direction to provide the void, the propellant thereby having:
    a first section including the initial burning surface for providing a first level of thrust when the bomb turns into a dive orientation; and
    a second section containing the void for providing a second level of thrust, including the increased thrust, throughout a remainder of bomb flight or until the propellant is used up.

2. A bomb according to claim 1 wherein a volume of the void is at least 2% of a volume of the propellant.

3. A bomb according to claim 1 wherein the rocket motor is arranged such that when the void is exposed there is a step increase in the first surface area of the burning surface.

4. A bomb according to claim 3 wherein when the void is exposed the first surface area of the burning surface increases by at least 10%.

5. A bomb according to claim 1 wherein the initial burning surface is substantially planar, and the burning surface on exposure of the void is non-planar.

6. A bomb according to claim 1 wherein the first surface area of the burning surface between the initial burning surface and the void is substantially constant.

7. A bomb according to claim 1, wherein the propellant between the initial burning surface and the void is a solid volume of propellant.

8. A bomb according to claim 1 wherein the rocket motor is arranged to generate a first thrust profile until exposure of the void, and a second thrust profile after exposure of the void, an average magnitude of thrust in the second profile being greater than in the first profile.

9. A bomb according to claim 1, wherein the rocket motor comprises:
    a fixed nozzle.

* * * * *